United States Patent
Beckstrom et al.

(10) Patent No.: US 8,655,837 B2
(45) Date of Patent: *Feb. 18, 2014

(54) DATA SESSION NOTIFICATION MEANS AND METHOD

(75) Inventors: Robert Beckstrom, Bolingbrook, IL (US); Anthony Dezonno, Bloomingdale, IL (US)

(73) Assignee: Aspect Software, Inc., Chelmsford, MA (US)

( * ) Notice: Subject to any disclaimer, the term of this patent is extended or adjusted under 35 U.S.C. 154(b) by 1449 days.

This patent is subject to a terminal disclaimer.

(21) Appl. No.: 10/675,371

(22) Filed: Sep. 30, 2003

(65) Prior Publication Data

US 2005/0071178 A1    Mar. 31, 2005

(51) Int. Cl.
*G06F 7/00* (2006.01)
*G06F 15/16* (2006.01)

(52) U.S. Cl.
USPC .............................. 707/621; 705/346; 709/206

(58) Field of Classification Search
USPC ........... 707/102, 621; 379/265; 709/206, 202; 705/346
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A * | 2/2000 | Miloslavsky | 709/206 |
| 6,044,145 A | 3/2000 | Kelly et al. | |
| 6,044,368 A | 3/2000 | Powers | |
| 6,047,060 A * | 4/2000 | Fedorov et al. | 379/265.02 |
| 6,067,357 A | 5/2000 | Kishinsky et al. | |
| 6,108,711 A | 8/2000 | Beck et al. | |
| 6,138,139 A * | 10/2000 | Beck et al. | 709/202 |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,353,810 B1 | 3/2002 | Petrushin | |
| 6,363,145 B1 * | 3/2002 | Shaffer et al. | 379/265.02 |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,408,064 B1 | 6/2002 | Fedorov et al. | |
| 6,542,602 B1 * | 4/2003 | Elazar | 379/265.06 |
| 6,724,887 B1 * | 4/2004 | Eilbacher et al. | 379/265.03 |
| 6,732,156 B2 | 5/2004 | Miloslavsky | |

FOREIGN PATENT DOCUMENTS

| | | |
|---|---|---|
| EP | 0981237 | 10/2003 |
| EP | 1096767 | 5/2004 |
| EP | 1432217 | 7/2004 |
| WO | WO 97/41678 | 11/1997 |
| WO | WO 01/54389 | 7/2001 |

* cited by examiner

*Primary Examiner* — Etienne Leroux
*Assistant Examiner* — Chelcie Daye
(74) *Attorney, Agent, or Firm* — Husch Blackwell LLP

(57) ABSTRACT

The method and apparatus is for improving transactions in a communication system. The method including: dynamically monitoring a data session between at least one of first and second parties in a transaction in the communication system; and engaging a third party into the transaction as a function of the monitoring of the data session between the first and second parties. The apparatus implements the method.

20 Claims, 3 Drawing Sheets

DATA SESSION NOTIFICATION MEANS AND METHOD

BACKGROUND

The field of the invention relates to communication systems and, in particular, to communication systems having automatic call distributors.

Automatic call distribution systems are known. Such systems are typically used, for example, within private branch telephone exchanges as a means of distributing telephone calls among a group of agents. While the automatic call distributor may be a separate part of a private branch telephone exchange, often the automatic call distributor is integrated into and is an indistinguishable part of the private branch telephone exchange.

Often an organization disseminates a single telephone number to its customers and to the public in general as a means of contacting the organization. As calls are often directed to the organization from the public switch telephone network, or, the communications network (e.g. the Internet) automatic call distribution system directs the calls to its agents based upon some type of criteria. For example, where all agents are considered equal, the automatic call distributor may distribute the calls based upon which agent has been idle the longest. The agents that are operatively connected to the automatic call distributor may be live agents, and/or virtual agents. Typically, virtual agents are software routines and algorithms that are operatively connected and/or part of the automatic call distributor.

Automatic call distributors are utilized in communications handling centers, such as call centers, that forward incoming communications, such as telephone calls, or other contacts for processing by one of several associated call-handling agents. The term "call" refers herein to any suitable communications including but not limited to, voice-over-Internet protocol communications; electronic mail messages; facsimiles, chat room dialog, instant messages, other Internet contacts. An automatic call distributor is any system which performs the functions of automatically distributing calls to agents while typically maintaining records of the call processing, and may employ a wide variety of architecture made up of software and/or hardware including, for example, integrated centralized systems, distributed systems, systems using one or more personal computers or services, etc. The communication between a caller and an agent may also be referred to as a data session, for example, the exchange of email.

Telephone call centers, for example, are often used to dispatch emergency services, as telemarketing sales centers, as customer service centers, etc. to automatically distribute received calls. Each incoming call may have a number of handling requirements, depending on, for example, the nature of the call, the originating call area, and the language of the call. Agents, on the other hand, each have abilities to process calls having certain handling requirements. Typically, agents are able to process one or more call types. For example, agents are typically trained to process certain call subject matters and certain call languages.

In some known call centers, computerized automatic call distributors place incoming calls, of a particular type, requiring defined skills, in queues of like calls. Appropriate agents have skills necessary to process calls in the queues, and are assigned to such queues. Agents are often assigned to multiple queues, reflective of their particular handling skills. Typically, this is done to increase the handling capacity of the center by making improved use of available communications handling resources.

Quite often, agents may handle calls related to one or more subject areas, and possess varied attributes that are relevant to all subject areas they are capable of handling. For example, a call center agent may speak multiple languages, and may therefore be able to process calls relating to a particular subject matter in all these languages. One simple approach used to deal with multiple agent attributes is to create and administer individual queues, each of which takes into account the subject matter and the attributes of the agent. This, however, is administratively very cumbersome.

Other known call centers use agent-skill indicators, associated with agents in order to connect calls. In such centers, a call is connected to an agent having an agent-skill indicator matching that of the call, within a group of agents. Agents, however, are typically only assignable to only one, and typically only a single agent-skill indicator is used to connect the call. Disadvantageously, such call centers do not use agent attributes across different groups. This may lead to an inefficient utilization of call center resources. Moreover, these communications handling centers do not allow for easy administration and re-assignment of agents to queues, while maintaining agent skill-sets.

One concern in designing an automatic call distributor system is ensuring that calls are efficiently routed to an agent, so as to minimize the amount of time that any particular call is placed on hold. One basic technique of minimizing on-hold time is to employ a first-in/first-out call handling technique. The first-in/first-out technique requires that calls be routed to the next available agent in the order in which the calls are received. However, in some automatic call distributor systems the agents are specialized in handling particular types of calls, so the first-in/first-out technique is not appropriate. For example in a product support department of a software facility, agents might be grouped according to specialized expertise, so that a first group is knowledgeable in word processing, a second group is knowledgeable in a database program, and a third group is knowledgeable in a spreadsheet program. Utilizing a first-in/first-out technique in such a situation is inappropriate, because a caller with a question regarding the word processing program may be routed to an agent having specialized knowledge regarding the database program or the spreadsheet program, rather than being routed to an agent with specialized knowledge in the word processing program.

The focus in the management of calls has been upon maximizing availability to customers, so as to achieve an acceptable profit margin in a competitive environment of customer service. Call management approaches that increase revenue may lead to savings for customers.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories based on the agent's skill types and levels.

The primary objective of call-distribution algorithms is to ultimately maximize call center performance. That may involve minimizing cost, maximizing call throughput, and/or maximizing revenue, among others. For example, when a new call arrives, the call may be handled by an agent who either has the ability to produce the most revenue or can handle the call in the shortest amount of time. Also, when an agent becomes available to handle a new call, the agent may handle either the call that has the possibility of generating the most revenue or the call that the agent is most efficient in handling.

After the caller has been connected to an agent via the automatic call distributor, for example, as described above, the call transaction between the caller and the agent, especially in the case of telemarketing, may begin to degrade. There may be certain indications or danger points that occur during a call transaction, which would indicate that the relationship between the caller and the agent is degrading. However, the agent may not realize that the transaction is in danger or that either the caller and/or agent has reached an emotional level that is not conducive to achieving a successful conclusion to the call transaction. In other words, either the caller nor the agent or both may reach such a negative emotional level such that a sale is lost. In known systems, it is up to the agent to determine when the emotional level has reached a point at which assistance should be requested. In other words, when a situation arises that is unmanageable; it is the agent's determination as to whether a call should be made for assistance. Thus, it is drawback of known systems, especially in telemarketing, that many sales are lost due to the agent not realizing until it is too late that the caller has become too angry or too emotional to achieve a sale.

Systems that perform voice recording and later analysis by the administrator are not real-time in nature and while they may help improve agent behavior they do not allow improvement during a transaction. The evaluator determines any stress analysis performed on the transaction at the time of listening to the recording and stress levels may be missed. Stress analysis performed during the transaction by an automated process can eliminate the human error component and increase the opportunity to improve the quality of the transaction. The administrator or coach can provide immediate corrective action thereby increasing the opportunity for call success rates. Post event measurement tools offer no opportunity to affect the caller and subsequently the outcome of the call.

Current methods often have the contact center supervisor "plug-in" to an agent to perform coaching and assistance but this limits the coach to only helping one agent. There is thus a need for a method that allows the system to determine the transaction in distress and join the coach to the situation. The coach could be available for many contact center agents simultaneously and may be joined with the individual needing assistance. In known systems, the agent can only review the completed data session, such as a transmitted email, after the email has been sent. Of course, any system administrator can review sent and received emails that reside on the server. However, this is inefficient and does not permit intervention during the transaction should intervention be needed.

SUMMARY

The method and apparatus is for improving transactions in a communication system. The method includes: dynamically monitoring a data session between at least one of first and second parties in a transaction in the communication system; and engaging a third party into the transaction as a function of the monitoring of the data session between the first and second parties.

BRIEF DESCRIPTION OF THE DRAWINGS

The features of the present invention, which are believed to be novel, are set forth with particularity in the appended claims. The invention, together with further advantages, may best be understood by reference to the following description taken in conjunction with the accompanying drawings. In the figures like reference numerals identify like elements.

DETAILED DESCRIPTION

Figure 1:
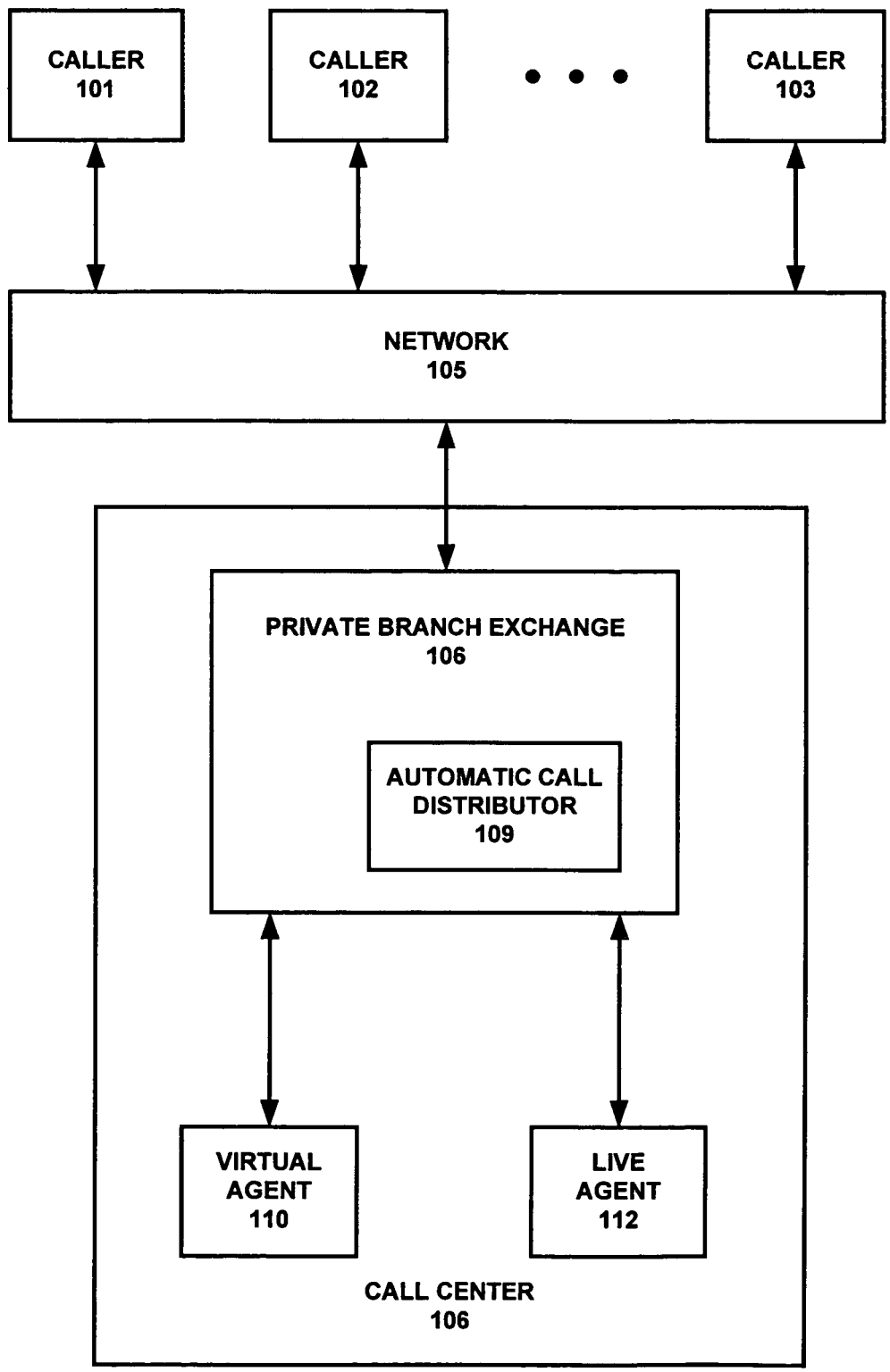
FIG. 1 is a block diagram of an example of a communication system for use with one embodiment of a communication system.

While the present invention is susceptible of embodiments in various forms, there is shown in the drawings and will hereinafter be descried some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

FIG. 1 is a block diagram of a specific embodiment of a communication system 100 having an automatic call distributor 109 that is part of a private branch exchange 108 in a call center 106. Calls may be connected between callers 101, 102, 103 via network 105 to the automatic call distributor 106. The automatic call distributor 106 may distribute the calls to telemarketers or agents, such as virtual agent 110, or live agent 112. The network 105 may be any appropriate communication system network such as a public switch telephone network, cellular telephone network, satellite network, land mobile radio network, the Internet, etc. Similarly, the automatic call distributor 109 may be any suitable structure including, for example, a stand-alone unit, a distributed system, integrated in a host computer, etc. The illustrated communication system 100 may be implemented under any of number of different formats. For example, where implemented in connection with a public switch telephone network, a satellite network, a cellular or land mobile radio network, embodiments of the present method and apparatus may operate within a host computer associated with the automatic call distributor and may receive voice information (such as pulse code modulation data) from a switched circuit connection which carries a voice between the callers 101, 102, 103 and the agents 110, 112.

Where embodiments of the present method and apparatus are implemented in connection with the Internet, they may operate, for example, from within a server. Voice information may be carried between the agents 110, 112 and callers 101, 102, 103 using packets.

As shown in the embodiment of FIG. 1, a caller, such as caller 101, may place a call, for example, an email, to the call center 106. The caller 101 typically uses a station set that may, for example, be embodied as a conventional telephone, videophone or personal computer configured with appropriate telephony software and/or Internet connectivity. The call is routed via the network 105 to the call center 100, in a conventional manner. The call may be routed within the call center 106 to a private branch exchange switch 108 that has an automatic call distributor 109. The private branch exchange switch 108 and the automatic call distributor 109 may comprise conventional hardware and software, as modified herein to carry out the functions and operations of embodiments of the present method and apparatus.

In the embodiment of FIG. 1, the private branch exchange switch 108 and the automatic call distributor 109 form a switching system designed to receive calls destined for call center 100, and queue them when an appropriate agent is not available. In addition, the automatic call distributor 109 distributes calls to agents or specific groups of agents according to a prearranged scheme. The automatic call distributor 109 may be integrated with the private branch exchange 108, as in the illustrative embodiment shown in FIG. 1, or provided by a separate unit or distributed units.

Examples of the network 105, as used herein, include but are not limited to the combination of local and long distance wire or wireless facilities and switches known as the public switched telephone network, as well as cellular network systems and digital communication networks such as the Internet. The network 105 is utilized to complete calls between (i) a caller at a station set, such as callers 101, 102, 103, and the call center 100; (ii) a caller on hold and a third party; and (iii) a caller on hold and a shared-revenue telephone service, such as a 900 or 976 service, provided by content provider. As is well known, shared-revenue telephone services deliver a particular service over the telephone and subsequently bill the caller. The telephone number from which a call is made typically identifies the caller. A subsequent bill is then included as part of the caller's regular telephone bill.

The Internet network, as used herein, includes the World Wide Web (the "Web") and other systems for storing and retrieving information using the Internet. To view a web site, typically the user communicates an electronic Web address, referred to as a Uniform Resource Locator ("URL"), associated with the web site. It is noted that if the caller accesses the call center 100 from a conventional telephone, the textual portions of a premium web site may be converted to speech for presentation to the caller.

Figure 2:
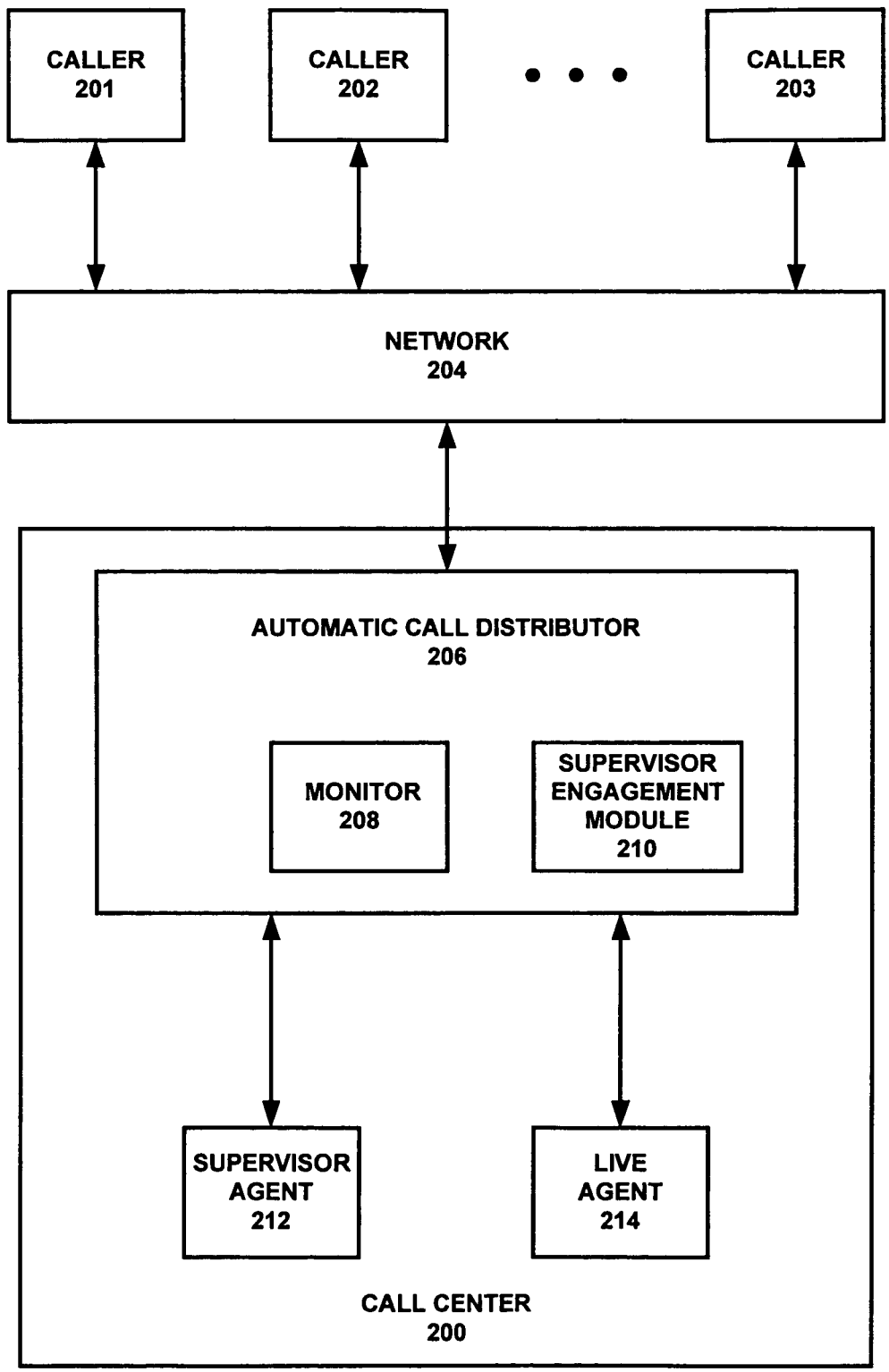
FIG. 2 depicts one embodiment of a communication system in block diagram form.

FIG. 2 is a diagram, which depicts an embodiment in a system wherein callers 201, 202, and 203 are connected via network 204 to a call center 200. The call center 200 has an automatic call distributor 206, which connects a caller, such as caller 201, to an agent 214. It is to be understood that agent 214 may be one of plurality of agents that are available within the call center 200. The automatic call distributor 206 has a monitor 208, which monitors at least one of the caller 201 and agent 214. Utilizing the monitor 208, a supervisor engagement module 210 engages the supervisor agent 212 into the call transaction between the caller 201 and the agent 214. The supervisor agent 212, which is a third party to the call transaction, may be a virtual party or be an automated input source. A virtual agent or an automated input source may be software, hardware, or any combination of hardware and software that performs one or more functions of a human agent. For example, an automated input source may generate data text messages in response to data messages provided by the customer. The supervisor agent 212 may engage in the background of the call transaction (only communicating with the agent 214) or may engage in the foreground of the call transaction and communicate with both the caller 201 and agent 214.

The monitor 208 may operate in substantially real-time to monitor the communication between the caller 201 and agent 214. Different parameters may be measured, such as voice analysis of caller and agent, frequency and type of eye and facial movement of the agent, body function changes of the agent (heart rate, change in breath rate, palm moisture, etc), pressure exerted by fingers on the keyboard by the agent, etc. Any of these could be base lined for each individual and deviations from established norms could be used as triggers to cause a supervisor to join a conversation. Thus, Supervisors have the ability to "see" what is going on in a data session between the caller and the agent, and direct intervention may take place by the supervisor during the data session, if needed. Thus the problem of "manual" review of stored data sessions is eliminated.

Figure 3:
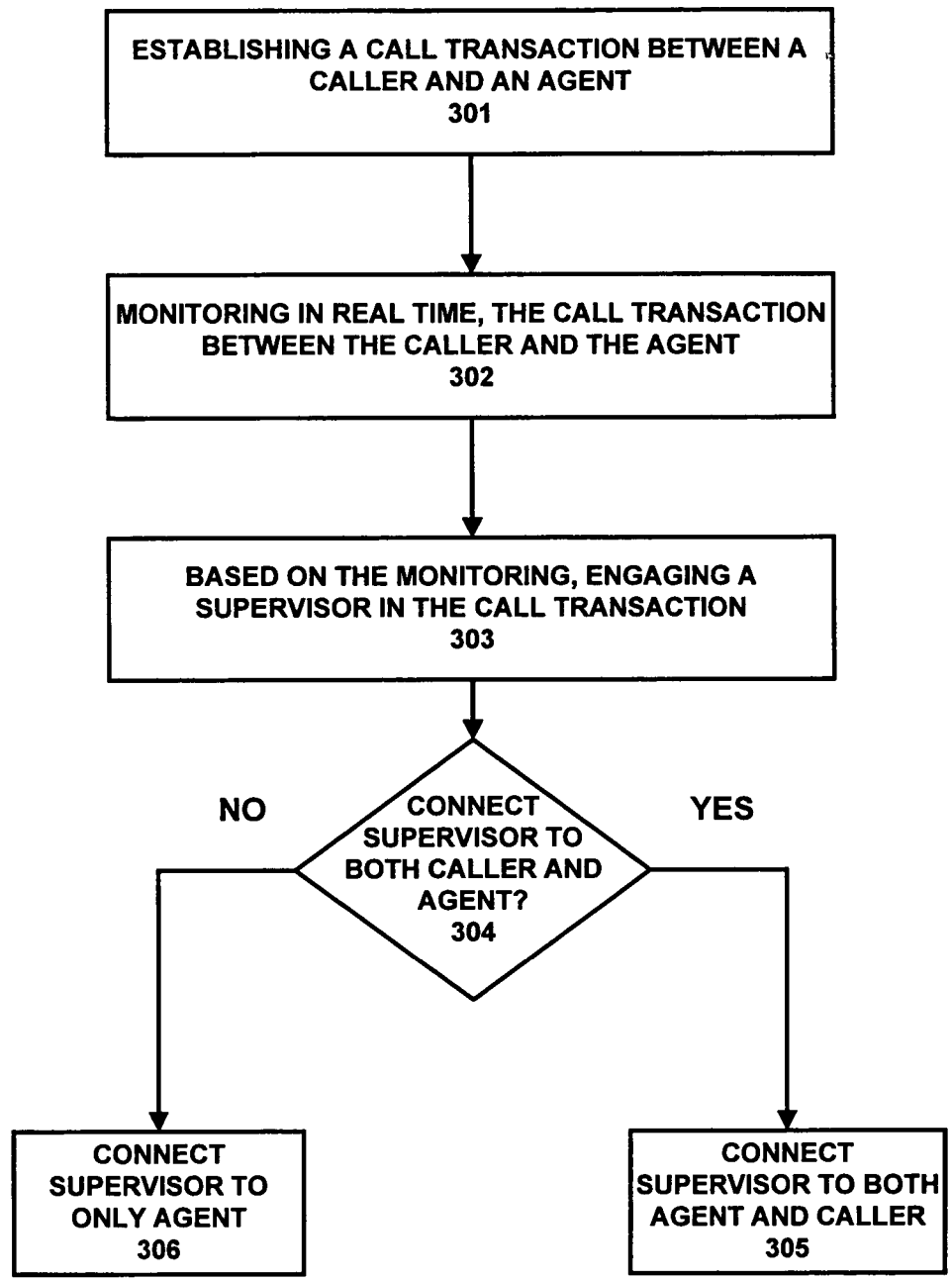
FIG. 3 is a flow diagram depicting an embodiment of a method of improving call transactions for use in a communication system.

FIG. 3 is a flow diagram depicting one embodiment of a method for improving call transactions in a communication system. Initially, a call transaction is established between a caller and an agent (first and second parties) in step 301. During the call transaction, call transaction between the caller and agent is monitored in step 302. In one embodiment this monitoring is performed substantially in real time. In some embodiments, the monitoring may include monitoring contents of one or more of the various possible message types including text messages, data messages, and the like. Such messages may in some embodiments, be monitored to allow the message to be reviewed before being sent out. Based on the monitoring, a supervisor is engaged as illustrated in step 303. Changes in the stress level being measured may be used to cause the decision to engage a supervisor. The change may be determined by using a number of different statistical models to indicate change such as percent deviation from proceeding time period or past interactions. A determination is then made as illustrated in step 304 as to whether the supervisor is to be connected to one or both of the caller and agent. A physical connection may be made between the desired parties using conferencing and/or monitoring techniques currently used by Automatic Call Distributors and other switching device, such as Private Branch Exchanges or network/data routers. The typical connections may be made to allow the supervisor access to the agent only or the agent and caller simultaneously.

As illustrated in step 306, the supervisor may be connected only to the agent, and in step 305, the supervisor is connected to both the agent and the caller. Thus, the supervisor can view an ongoing data session, similar to a data "tap." This may be done if the supervisor suspects improper agent activity. To increase the efficiency of the system, the system may automatically attempt to detect improper activity in real-time. For example, the system may automatically alert the supervisor if the system detects certain key words and/or phrases, which may be indicative of improper behavior. Perhaps words and phrases commonly associated with vulgarity and pornography would raise a flag or certain problematic phrases (e.g. "secret", "confidential" or "promise") could be detected to allow the message to be reviewed in more detail before being sent out. Alternatively fuzzy logic or AI may be used to determine possible improper activity. Additionally, the detection method may be subject-based or may be tailored to the specific agent group or department in the call center. In another example, if the customer indicates that he or she wants to deal with a supervisor, the system may automatically detect this (based on keyword "supervisor") and alert the supervisor either before the agent calls the supervisor, or before the agent improperly terminates the call to avoid contacting the supervisor.

Once the system detects such potential improper activity, the system determines the identity of that agent's supervisor, and alerts that supervisor. The supervisor may then decide to view the ongoing transaction, or if the transaction has already ended, that transaction, which has been stored, may be reviewed. Also, subsequent transactions by that agent or subsequent transactions between the agent and the prior caller may "tagged" for immediate alert and review by the supervisor. Note that not only can the supervisor view the ongoing data transaction, but the supervisor may also be "conferenced" into the transaction so that a 3-way transaction ensues.

It is to be understood, of course, that the present invention in various embodiments can be implemented in hardware, software, or in combinations of hardware and software.

The invention is not limited to the particular details of the example of apparatus and method depicted, and other modifications and applications are contemplated. Certain other changes may be made in the above-described apparatus and method without departing from the true spirit and scope of the invention herein involved. For example, although the invention is depicted in the environment of an automatic call distributor, the method and apparatus of the present invention can be utilized in other types of communication systems. Also for example, the present invention can be implemented in an Internet based system whereby not only can the stress levels be determined from a voice input, but also from actual video input of the parties to the call transaction. It is intended, therefore, that the subject matter in the above depictions shall be interpreted as illustrative.

What is claimed is:

1. A method for improving transactions in a communication system, comprising:
   automatically monitoring an ongoing text data session between first and second parties in an established transaction in the communication system; and
   automatically conferencing a third party into the transaction as an additional participant in the transaction in response to the automatic monitoring of the data session between the first and second parties.

2. The method according to claim 1, wherein the third party is at least one of a virtual party and an automated input.

3. The method according to claim 1, wherein the third party is automatically engaged in response to the automatic monitoring to review at least one of text messages and emails before they are sent.

4. The method according to claim 1, wherein the third party is automatically engaged into a background of the ongoing data session of at least one of the first and second parties in response to the automatic monitoring.

5. The method according to claim 1, wherein the third party is automatically engaged into a foreground of the ongoing data session to reduce the stress levels of at least one of the first and second parties in response to the automatic monitoring.

6. The method according to claim 1, wherein the third party communicates only with one of the first and second parties.

7. The method according to claim 1, wherein the third party communicates with both of the first and second parties.

8. The method according to claim 1, wherein the monitoring of the data session between the first and second parties is conducted in real-time and wherein measured changes in stress levels of one of the parties based upon a deviation from a preceding time period cause engagement of the third party.

9. The method according to claim 1, wherein the monitoring of the data session is conducted by at least one of analyzing a respective voice signal of at least one of the first and second parties, converting a respective voice signal of at least one of the first and second parties to text and analyzing the text, and analyzing a physical stress level of at least one of the first and second parties.

10. The method according to claim 1 wherein the automatic monitoring comprises automatic inspection of content of data messages, text messages, and emails to detect problematic phrases, and wherein detection of problematic phrases within the content engages the third party.

11. An apparatus for improving transactions in a communication system, comprising:
    means for automatically monitoring an ongoing data session including at least one of data messages and text messages between first and second parties in an on-going transaction in the communication system; and
    means for automatically engaging a third party into the on-going transaction as an additional participant in the transaction in response to the automatic monitoring of the data session between the first and second parties.

12. The apparatus according to claim 11, wherein the data session is internet based and monitoring includes monitoring video input of the parties to the transaction to assist in determining stress levels of the parties.

13. The apparatus according to claim 11, wherein one of the parties in the transaction is a customer, wherein the monitoring comprises automatically detecting a keyword use by the customer indicating that the customer desires to deal with a supervisor and wherein the means for automatically engaging engages the supervisor in response thereto.

14. The apparatus according to claim 11, wherein the third party is automatically engaged into a background of the ongoing data session of at least one of the first and second parties in response to the automatic monitoring.

15. The apparatus according to claim 11, wherein the third party is automatically engaged into a foreground of the ongoing data session to reduce stress levels of at least one of the first and second parties in response to the automatic monitoring.

16. The apparatus according to claim 11, wherein the third party communicates only with one of the first and second parties.

17. The apparatus according to claim 11, wherein the third party communicates with both of the first and second parties.

18. The apparatus according to claim 11, wherein the monitoring of the data session between the first and second parties is conducted in real-time.

19. The apparatus according to claim 11, wherein the means for monitoring of the data session is at least one of; means for analyzing a respective voice signal of at least one of the first and second parties, means for converting a respective voice signal of at least one of the first and second parties to text and analyzing the text, and means for analyzing a physical stress level of at least one of the first and second parties.

20. A system for improving transactions in a communication system comprising:
    a computerized transaction handling system which handles text data sessions established between first and second parties in an ongoing transaction in the communication system;
    a computerized sub-system associated with the transaction handling system which automatically monitors at least some of the data sessions; and
    a computerized sub-system associated with the transaction handling system which automatically joins a third party into the ongoing transaction as an additional participant in the transaction in response to detection in real-time of at least one target parameter by the automatic monitoring.

* * * * *